US009247407B1

(12) United States Patent
Schumacher

(10) Patent No.: US 9,247,407 B1
(45) Date of Patent: Jan. 26, 2016

(54) METHOD AND SYSTEM OF DISTRIBUTING ALERTS WITHIN A TARGET AREA

(71) Applicant: Sprint Spectrum L.P., Overland Park, KS (US)

(72) Inventor: Gregory D. Schumacher, Holliston, MA (US)

(73) Assignee: Sprint Spectrum L.P., Overland Park, KS (US)

( * ) Notice: Subject to any disclaimer, the term of this patent is extended or adjusted under 35 U.S.C. 154(b) by 42 days.

(21) Appl. No.: 13/967,107

(22) Filed: Aug. 14, 2013

(51) Int. Cl.
*H04W 4/00* (2009.01)
*H04H 20/88* (2008.01)
*H04W 4/22* (2009.01)
*H04H 20/86* (2008.01)

(52) U.S. Cl.
CPC ............... *H04W 4/22* (2013.01); *H04H 20/86* (2013.01)

(58) Field of Classification Search
CPC ............................... H04W 4/22; H04H 20/88
USPC ...................................................... 455/404.2
See application file for complete search history.

(56) References Cited

U.S. PATENT DOCUMENTS

| 6,745,021 | B1 | 6/2004 | Stevens |
| 8,054,772 | B1 | 11/2011 | Upadhyay et al. |
| 2002/0075155 | A1 | 6/2002 | Guillory |
| 2005/0261012 | A1 | 11/2005 | Weiser |
| 2006/0135058 | A1 | 6/2006 | Karabinis |
| 2009/0058665 | A1 | 3/2009 | Lamb |
| 2009/0165065 | A1 | 6/2009 | McClenny et al. |
| 2009/0291630 | A1* | 11/2009 | Dunn et al. .................. 455/3.01 |
| 2009/0325536 | A1 | 12/2009 | McKenna et al. |
| 2009/0325538 | A1* | 12/2009 | Sennett et al. ............. 455/404.2 |
| 2010/0142438 | A1 | 6/2010 | Chen et al. |
| 2011/0081883 | A1 | 4/2011 | Daly |
| 2011/0081884 | A1 | 4/2011 | Sennett et al. |
| 2011/0103302 | A1 | 5/2011 | Hall |
| 2012/0064921 | A1* | 3/2012 | Hernoud et al. ........... 455/456.6 |
| 2012/0309400 | A1 | 12/2012 | Inumaru |
| 2013/0204517 | A1* | 8/2013 | Raju et al. ..................... 701/400 |
| 2013/0344840 | A1* | 12/2013 | Titus .......................... 455/404.1 |

OTHER PUBLICATIONS

"Wireless Emergency Alerts System Enhancement Recommendations," Jul. 2013, Department of Homeland Security, available at http://www.firstresponder.gov/TechnologyDocuments/Wireless%20Emergency%20Alerts%20System%20Enhancements.pdf.*
U.S. Appl. No. 13/662,426, filed Oct. 27, 2012.

(Continued)

*Primary Examiner* — Vladimir Magloire
*Assistant Examiner* — David Orange

(57) ABSTRACT

After receiving a message that defines an initial target area for distribution of an alert, a wireless carrier network may identify a first set of one or more coverage areas that are fully encompassed within the initial target area and a second set of one or more coverage areas that are partially encompassed within the initial target area. For each partially-encompassed coverage area, the network may then define a respective target area that is less geometrically complex than the initial target area. In turn, the network may broadcast the alert (1) in each fully-encompassed coverage area in a manner that directs a recipient device to output the alert regardless of the device's location and (2) in each partially-encompassed coverage area in a manner that directs a recipient device to output the alert only if the device's location is encompassed within the respective target area for the coverage area.

16 Claims, 7 Drawing Sheets

(56) References Cited

OTHER PUBLICATIONS

Gunduzhan, Abstract: Enhanced GEo-targeting for CMAS (41st Conference on Broadcast Meteorology/Second Conference on Weather Warnings and Communication), 2013.

First Action Interview Pilot Program Pre-Interview Communication from U.S. Appl. No. 13/662,426, dated Mar. 11, 2014.
Office Action from U.S. Patent Appl. No. 13/662,426, dated Jul. 8, 2014.
Office Action from U.S. Appl. No. 13/662,426, dated Dec. 16, 2014.
Office Action from U.S. Appl. No. 13/662,426, dated Mar. 31, 2015.

* cited by examiner

METHOD AND SYSTEM OF DISTRIBUTING ALERTS WITHIN A TARGET AREA

BACKGROUND

Various systems exist for providing the public with alerts of information of interest, such as criminal activity (e.g., terrorist attack, child abduction, etc.), severe weather, natural disasters, and/or other events that have an impact on public safety. In the earlier days, these systems were typically designed to distribute alerts using broadcast media, such as television or radio. More recently, however, systems have been designed to distribute alerts to the public using wireless carrier networks. As one example, the Federal Communications Commissions (FCC) has established the Commercial Mobile Alert System (CMAS), which facilitates the distribution of alerts by a wireless carrier to their subscribers in the event of national emergencies ("Presidential Alerts"), emergencies where life or property is at risk ("Imminent Threat Alerts"), and/or emergencies involving missing or endangered children ("AMBER Alerts").

A typical wireless carrier network includes a number of base stations that radiate to define wireless coverage areas, such as cells and cell sectors, in which wireless communication devices (WCDs) can operate and engage in air-interface communication with the wireless carrier network. Each base station may then be coupled with equipment that provides connectivity with one or more transport networks, such as the public switched telephone network (PSTN) and/or the Internet for instance. Within this arrangement, a WCD operating in a coverage area of the wireless carrier network can thus engage in communication, via the wireless carrier network, with other WCDs operating in the wireless carrier and/or with various entities sitting outside the wireless carrier network, such as an alert provider sitting on a transport network.

OVERVIEW

Systems such as CMAS that distribute alerts using wireless carrier networks may allow for the distribution of geographically-targeted alerts to subscribers located in particular wireless coverage areas (e.g., cells and/or sectors). For instance, a wireless carrier may receive an alert message that defines a target area for distribution of an alert, such as a geocoded area or a polygon defined by a set of geographic coordinates. In turn, the wireless carrier network may identify each coverage area (e.g., each cell and/or sector) that falls within the defined target area—including those coverage areas that only partially fall within the defined target area—and then broadcast the alert in the entirety of each such coverage area. As a result, WCDs that are located in any portion of an identified coverage area that falls outside of the target area will still receive and output the alert, even though these WCD are not actually located within the target area and thus not the intended recipients of the alert. This results in overalerting and degrades the accuracy of the alert distribution system.

One proposed approach for improving the accuracy of such an alert distribution system is to broadcast a definition of the target area together with the alert in each coverage area encompassed within the target area, and then have each WCD located in those coverage areas decide whether to output the alert based on whether the WCD is located in the target area. However, this approach may impose an undesirable burden on both the network resources required to send the alert and the processing required for the WCDs to decide whether to output the alert—particularly when the target area is geometrically complex.

U.S. patent application Ser. No. 13/662,426, which was filed on Oct. 27, 2012 and assigned to Sprint Spectrum L.P., discloses methods and systems that help to address this issue. That disclosure is incorporated herein by reference.

Disclosed herein are methods and systems that further help to address this issue. According to the disclosed methods, after receiving a message that defines an initial target area for distributing an alert, a wireless carrier network may identify a first set of one or more coverage areas that are fully encompassed within the initial target area and a second set of one or more coverage areas that are only partially encompassed within the initial target area. For each partially-encompassed coverage area, the wireless carrier network may then define a respective target area that is less geometrically complex than the initial target area. Thereafter, the wireless carrier network may broadcast the alert (1) in each fully-encompassed coverage area in a manner that directs a recipient device to output the alert regardless of the device's location and (2) in each partially-encompassed coverage area in a manner that directs a recipient device to output the alert only if the device determines that its location is encompassed within the respective target area for the coverage area.

Thus, the disclosed methods may advantageously improve the accuracy of alert distribution systems while limiting the burden imposed on the network's resources and the WCDs' processing. For instance, by directing only WCDs in the partially-encompassed coverage area(s) to determine whether they are located in a target area, the disclosed methods may obviate the need for the network to send a target area definition to WCDs in the fully-encompassed coverage area(s) and/or for such WCDs to decide whether to output the alert. In addition, by providing WCDs in the partially-encompassed coverage area(s) with a definition of a less geometrically complex target area, the disclosed methods may reduce the network resources required to send target area definitions and also simplify the processing required for WCDs to decide whether to output the alert.

One embodiment of the disclosed methods may involve (a) receiving a message that defines an initial target area for distribution of an alert, (b) identifying, from a plurality of wireless coverage areas of a wireless carrier network, a first set of one or more coverage areas that are fully encompassed within the target geographical area and a second set of one or more coverage areas that are partially encompassed within the target geographical area, (c) for each coverage area in the second set of one or more coverage areas, defining a respective target area that is less geometrically complex than the initial target area, (d) in each coverage area in the first set of one or more coverage areas, broadcasting the alert in a manner that directs a recipient device to output the alert regardless of a location of the device, and (e) in each coverage area in the second set of one or more coverage areas, broadcasting the alert in a manner that directs a recipient device to output the alert only if a location of the device is encompassed within the respective target area for the coverage area.

The alert may take any form that serves to notify people of information of interest, such as criminal activity, severe weather, natural disasters, and/or other events that have an impact on public safety. As one example, the alert may initially be defined in a message received from an alert provider. The alert may take various other forms as well.

The identifying of the first and second sets of one or more coverage areas may also take various forms. In one example implementation, this feature may involve (1) comparing a definition of the initial target area to definitions of the plurality of coverage areas of the wireless carrier network (e.g., using mapping techniques and/or other algorithms) and then (2) based on the comparing, identifying a first set of the plurality of coverage areas of the wireless carrier network that are entirely located within the initial target area and a second set of the plurality of coverage areas of the wireless carrier network that are only partially located within the initial target area. This feature may take other forms as well.

The defining of a respective target area that is less geometrically complex than the initial target area comprises may likewise take various forms. In one example implementation, for each coverage area in the second set of one or more coverage areas, this feature may involve (1) defining an overlapping area between the initial target area and the coverage area, (2) defining a simplified area that approximates the overlapping area, and (3) designating the simplified area as the respective target area for the coverage area. This simplified area may take various forms, examples of which include a partial circle, a full circle, a triangle, and a rectangle. This feature may take other forms as well.

The broadcasting of the alert may take various forms as well. In one example implementation, the broadcasting of the alert in a manner that directs a recipient device to output the alert regardless of a location of the device may involve broadcasting the alert without a definition of a target area, and the broadcasting of the alert in a manner that directs each recipient device to output the alert only if a location of the device is encompassed within a respective target area for the coverage area in which the broadcast occurs may then involve broadcasting the alert with a definition of the respective target area. This definition may take various forms depending on the nature of the respective target area.

In another example implementation, the broadcasting of the alert in a manner that directs a recipient device to output the alert regardless of a location of the device may involve broadcasting the alert without a flag that directs a recipient device to determine whether a location of the device is encompassed within a target area, and the broadcasting of the alert in a manner that directs each recipient device to output the alert only if a location of the device is encompassed within a respective target area for the coverage area in which the broadcast occurs may then involve broadcasting the alert with a flag that directs a recipient device to determine whether a location of the device is encompassed within the respective target area. This flag may take various forms.

These two example implementations for broadcasting the alert may also be combined. And the broadcasting of the alert may take various other forms as well.

Also disclosed herein are network entities and computer-readable media configured to facilitate implementation of the disclosed methods These as well as other aspects and advantages will become apparent to those of ordinary skill in the art by reading the following detailed description, with reference where appropriate to the accompanying drawings.

DETAILED DESCRIPTION

Figure 1:
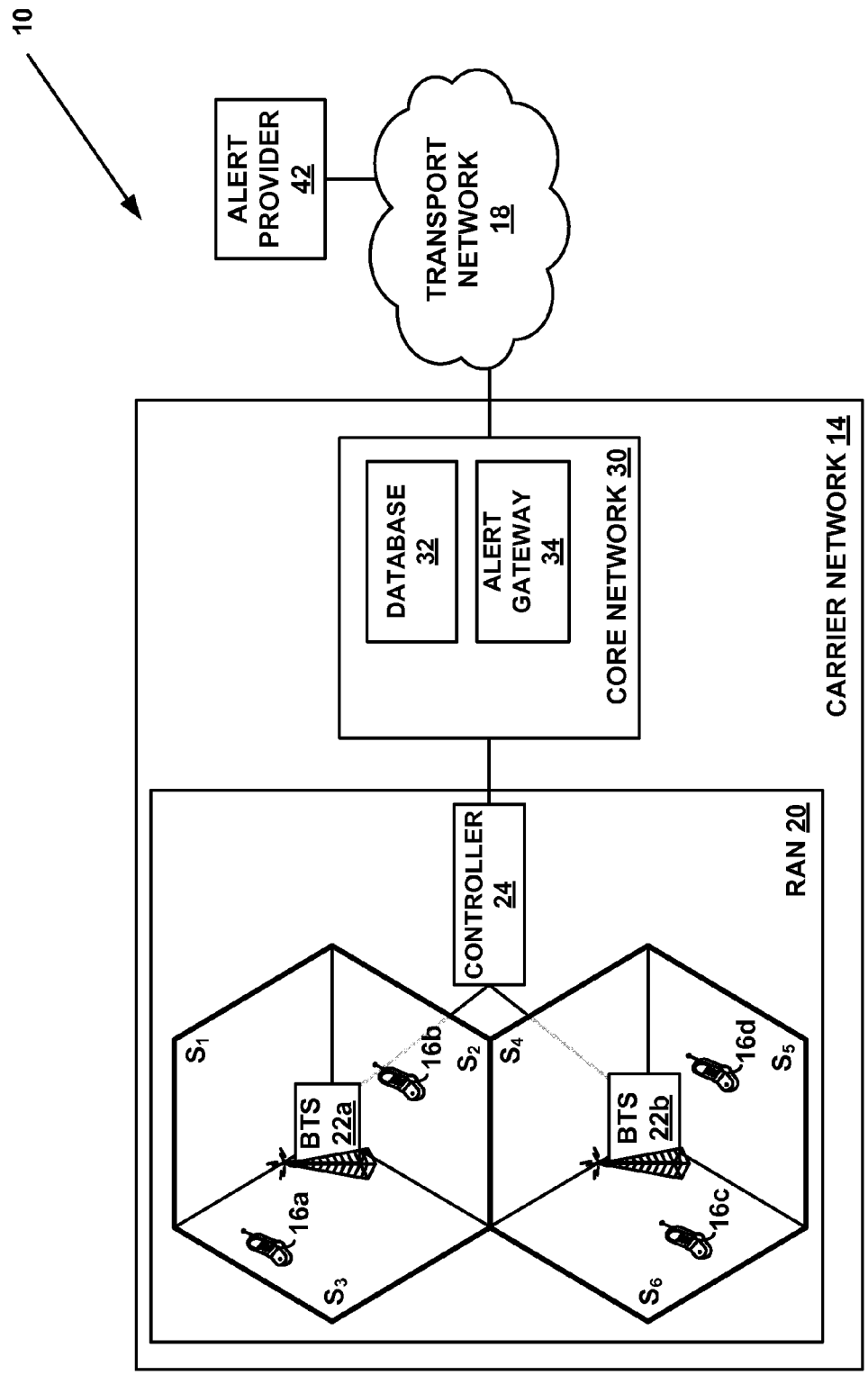
FIG. 1 is a simplified block diagram of an example communication system in which in which embodiments of the disclosed methods and entities can be implemented.

Referring to the drawings, FIG. 1 is a simplified block diagram of an example communication system 10 in which embodiments of the disclosed methods and entities can be implemented. It should be understood, however, that this and other arrangements described herein are set forth as examples only. As such, those skilled in the art will appreciate that other arrangements and elements (e.g., machines, interfaces, functions, orders of functions, etc.) can be used instead, some elements may be added, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware and/or software logic. For instance, various functions may be carried out by a processor executing instructions written in any suitable programming language and stored in memory.

FIG. 1 depicts example system 10 as including a representative wireless carrier network 14 that facilitates communication with wireless communication devices (WCDs) (e.g., cellular telephones, tablets or other wirelessly-equipped computers, mobile hotspots, etc.), such as WCDs 16a-d, and provides connectivity with one or more transport networks (e.g., the public switched telephone network (PSTN) and/or the Internet), such as representative transport network 18. As shown, wireless carrier network 14 may take the form of one or more radio access networks (RANs), such as representative RAN 20, each communicatively coupled to a core network 30. Other arrangements are possible as well.

RAN 20 may include one or more base stations (e.g., base transceiver stations, access nodes, node-Bs, eNodeBs, etc.), each including an antenna an antenna system for emitting radio frequency (RF) radiation to define one or more coverage areas (e.g., a cell and/or cell sectors) in which the base station can engage in air-interface communication with WCDs. For example, FIG. 1 shows RAN 20 as including at least a first base station 22a that radiates to define representative cell sectors $S_1$-$S_3$ and a second base station 22b that radiates to define representative cell sectors $S_4$-$S_6$. It should be understood, however, that the depicted arrangement of base stations and coverage areas is for purposes of illustration only, and that numerous other arrangements of base stations and coverage areas are possible as well.

In practice, base stations such as base stations 22a-b and WCDs such as WCDs 16a-d may be arranged to engage in air-interface communication with each other according to an agreed air-interface protocol, examples of which include CDMA (e.g., 1×RTT or 1×EV-DO), LTE, WiMAX, IDEN, HSDPA, GSM, WI-FI, and/or any others now known or later developed. This agreed air-interface protocol may divide the air interface in each coverage area into a "downlink" (or "forward link") for carrying communications from base stations to WCDs and a "uplink" (or "reverse link") for carrying communications from WCDs to base stations. Further, the agreed air-interface protocol may employ techniques such time-division multiplexing, frequency-division multiplexing, and/or code-division multiplexing to divide the downlink and uplink into channels and/or other discrete resources that can be allocated for carrying control and/or bearer data between base stations and WCDs.

RAN 20 may also include one or more controllers (e.g., a base station controller, radio network controller, etc.) that provide connectivity between base stations 22a-b and core network 30 and may also help to control aspects of base-station and/or air-interface operation. For example, FIG. 1 shows RAN 20 as including a separate controller 24 that is communicatively coupled to base stations 22a-b and provides connectivity to core network 30. In other implementations, each of base stations 22-b may have its own respective controller that is integrated in whole or in part with the base station. Other arrangements are possible as well.

Core network 30 may include network infrastructure that provides connectivity between RAN 20 and transport network 18 and may also help to control aspects of RAN operation. Although not shown, examples of such network infrastructure may include a mobile switching center (MSC), a message center (MC), a packet data serving node (PDSN), a serving gateway (SGW), a packet data network gateway (PGW), a mobility management entity (MME), a home location register (HLR), a home subscriber server (HSS), and the like. (It should also be understood that at least some of these components might be considered to be part of a network other than core network 30, such as RAN 20.)

As shown in FIG. 1, wireless carrier network 14 may also include a database 32 that contains data about the wireless carrier network's coverage areas. Database 32 may take the form of any server or other entity that is arranged to store this coverage-area data. For example, FIG. 1 shows database 32 as a separate entity that sits on (or is otherwise coupled to) core network 30. In an alternate example, however, one or more other network entities may be arranged to store coverage-area data for wireless carrier network 14 and thus serve as database 32. Other arrangements are possible as well.

The stored coverage-area data for wireless carrier network 14 may take various forms. As one example, the coverage-area data may include data identifying each coverage area of wireless carrier network 14, such as a cell ID, a sector ID, a carrier frequency, and/or pseudo-random noise offset for instance. As another example, the data identifying each coverage area may be correlated with data identifying particular network entities that serve the coverage area, such as an identifier of a serving base station, controller, and/or MSC for instance. As yet another example, the coverage-area data may include definitions of each coverage area of wireless carrier network 14, which may include geographic data such as a geographic coordinate of the coverage area's serving base station (or centroid), a distance of the coverage area's radius, and/or a set of geographic coordinates that define the coverage area's boundaries for instance. Other examples are possible as well.

As further shown in FIG. 1, wireless carrier network 14 may include an alert gateway 34 that functions to process alert messages received from an alert provider, such as example alert provider 42 situated on transport network 18, and to facilitate distribution of these alert messages to WCDs operating in wireless carrier network 14. Alert gateway 34 may take the form of any server or other entity that is arranged to carry out these functions. For example, FIG. 1 shows alert gateway 34 as a separate server that sits on (or is otherwise coupled to) core network 30. In an alternate example, however, one or more other network entities may be arranged to carry out these functions and thus serve as alert gateway 34. One example of such an entity is a cell broadcast centre (CBC). Alert gateway 34 may take other forms as well.

To facilitate the processing and distribution of alerts, alert gateway 34 may also store and/or have access to preexisting data regarding known target areas for distribution alerts. This preexisting data may take various forms. As one possible example, the preexisting data may include a list of geocodes that are each keyed to a more detailed definition of the geocoded area, such as a set of geographic coordinates that define the boundaries of the geocoded area. Other examples are possible as well.

Alert provider 42 may function to generate and/or transmit messages that contain data defining an alert intended to notify people in a target geographic area of information of interest, such as criminal activity, severe weather, natural disasters, and/or other events that have an impact on public safety. Alert provider 42 may take the form of any server or other entity that is arranged to carry out these functions. As one example, alert provider 12 may be a server or other entity operated by a national agency, such as the Department of Homeland Security, the National Weather Service, etc. As another example, alert provider 42 may be a server or other entity operated by a local agency, such as a law enforcement agency. As yet another example, alert provider 42 may be a server or other entity that functions to aggregate alerts from other alert providers, such as those described above. Alert provider 42 may take other forms as well.

The alert messages generated and/or transmitted by alert provider 42 may be formatted according to any agreed protocol, examples of which include Common Alerting Protocol (CAP), Specific Area Message Encoding (SAME), Atom Syndication Format (ATOM), Short Message Service (SMS), or any others now known or later developed. Further, the alert messages may include various data that will enable a wireless carrier network to distribute the alert to people in a target geographic area. For example, an alert message may include various data about the message itself, such as an indicator of the type, sender, and/or intended recipients of the message. As another example, an alert message may include various data about the information that is the subject of the alert, such as an indicator of the type, category, importance, severity, and/or urgency of the subject information, a textual description of the subject information, and/or a time associated with the subject information. As yet another example, an alert message may include a definition of the target area where the alert should be distributed, such as a geocode or a set of geographic data (e.g., geographic coordinates for boundary points) for instance. Other examples are possible as well.

Figure 2:
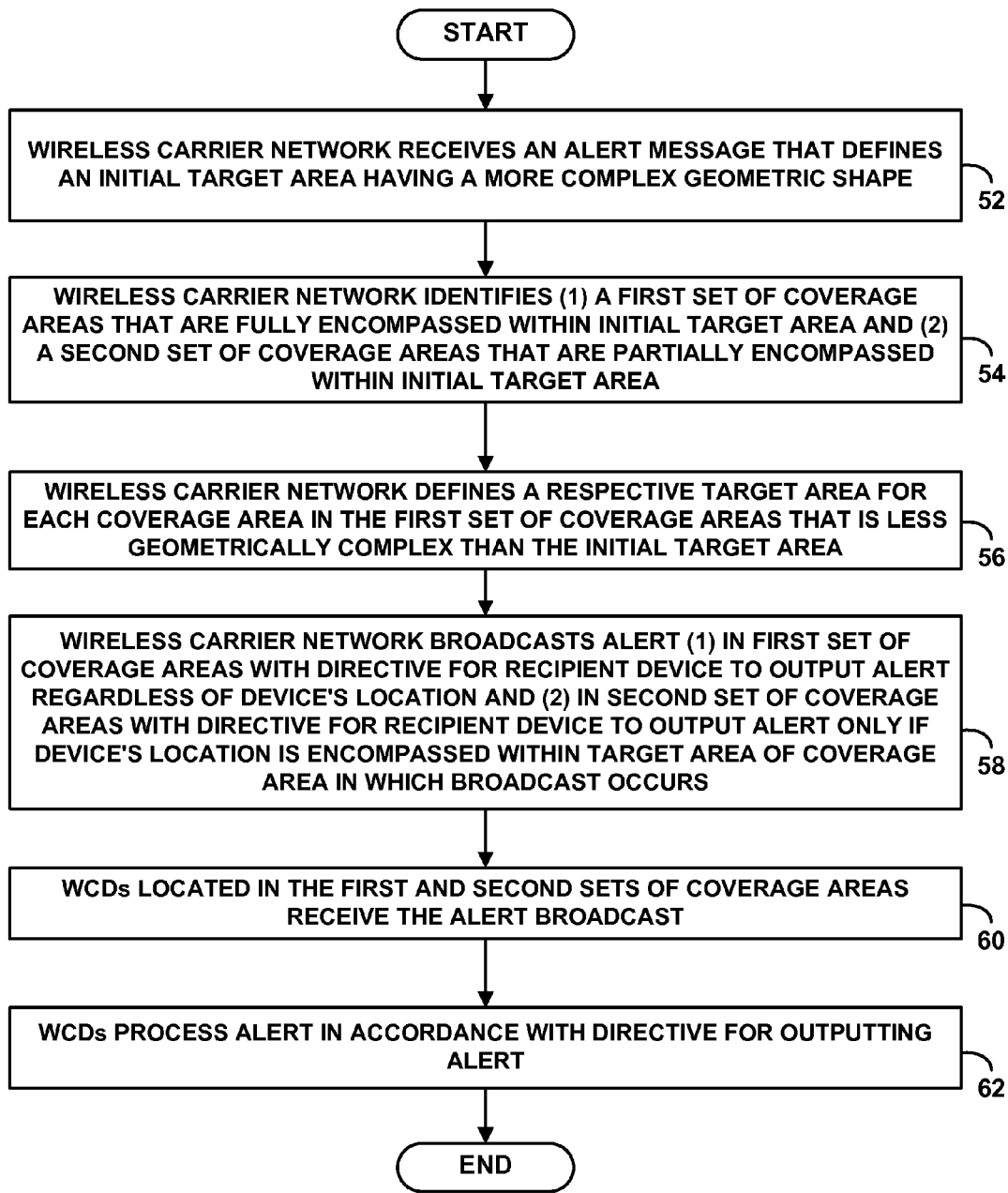
FIG. 2 is a flow chart depicting functions that can be carried out in accordance with an example embodiment of the disclosed methods.

Turning now to FIG. 2, a flow chart is shown to illustrate functions that can be carried out in accordance with an example embodiment of the disclosed methods. For purposes of illustration only, these functions will be described with reference to example system 10.

Figure 3:
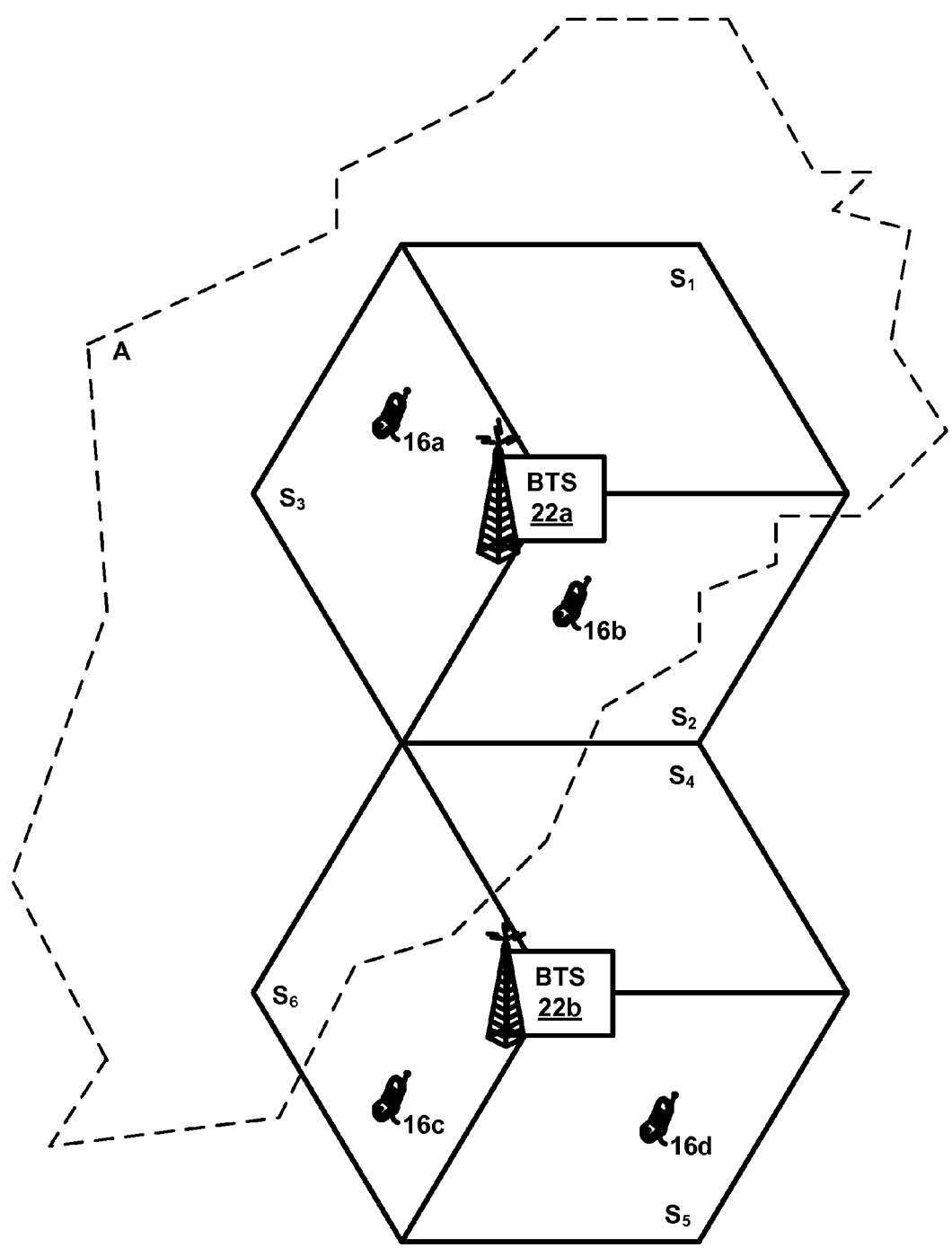
FIG. 3 depicts one possible example of an initial target area for an alert in the example communication system of FIG. 1.

As shown in FIG. 2, the example embodiment may begin at step 52 with alert gateway 34 receiving, from alert gateway 42, an alert message that defines an initial target area having a more complex geometric shape, such as a geocoded area or a polygon having relatively complex boundaries that are defined by a large set of geographic coordinates. For purposes of illustration, FIG. 3 depicts a portion of one possible example of an initial target area A for system 10.

At step 54, after receiving the alert message, alert gateway 34 may identify two sets of coverage areas from the wireless carrier network's plurality of coverage areas: (1) a first set of one or more coverage areas that are fully encompassed within the initial target area and (2) a second set of one or more coverage areas that are only partially encompassed within the initial target area. For example, with reference to FIG. 3, alert gateway 34 may identify a first set of fully-encompassed coverage areas for initial target area A that includes sectors $S_1$ and $S_3$ and a second set of partially-encompassed coverage areas for initial target area A that includes sectors $S_2$, $S_4$, and $S_6$. (It should be understood that in performing this function, alert gateway 34 will likely also identify a third set of one or more coverage areas that are located entirely outside the initial target area).

Alert gateway 34 may carry out this identification using any technique now known or later developed. In one example implementation, alert gateway 34 may identify the sets of fully-encompassed and partially-encompassed coverage areas for the initial target area by comparing a definition of the initial target area to definitions of the wireless carrier network's coverage areas. This comparison may take various forms. As one example, alert gateway 34 may perform this comparison by using the definitions to overlay a map of the initial target area with a map of the coverage areas of wireless carrier network 14 (e.g., as depicted in FIG. 3). As another example, alert gateway 34 may perform this comparison by executing, for each respective coverage area of wireless carrier network 14, a mathematical algorithm that takes the definitions of the initial target area and the respective coverage area as its inputs. Other techniques may also be employed. Based on this comparison, alert gateway 34 may then identify the sets of fully-encompassed and partially-encompassed coverage areas for the initial target area.

In another example implementation, alert gateway 34 may identify the sets of fully-encompassed and partially-encompassed coverage areas for the initial target area based on preexisting data that identifies the fully-encompassed and partially-encompassed coverage areas for certain known target areas (which may be generated according to the techniques described above for instance). This preexisting data may be stored at alert gateway 34 and/or some other network entity that is accessible by alert gateway 34 (e.g., database 32). Further, this preexisting data may take various forms. As one possible example, the preexisting data may include identifiers of known target areas (e.g., geocodes) that are each keyed to identifiers of the target area's fully-encompassed and partially-encompassed coverage areas. Other examples are possible as well.

As part of identifying the sets of fully-encompassed and partially-encompassed coverage areas for the initial target area, alert gateway 34 may also identify one or more network entities that serve each coverage area in these sets, such as a serving base station, controller, and/or MSC for instance. Alert gateway 34 may then store data defining the sets of fully-encompassed and partially-encompassed coverage areas for the initial target area, which may include as examples a geographic definition of the initial target area, an indicator of whether the set includes fully-encompassed or partially-encompassed coverage areas, an identifier of each coverage area included in the set, and an identifier of entities identified as serving each coverage area.

At step 56, after identifying the sets of fully-encompassed and partially-encompassed coverage areas for the initial target area, alert gateway 34 may define a respective target area for each partially-encompassed coverage area that is less geometrically complex than the initial target area. Alert gateway 34 may carry out this function in various manners.

According to one implementation, for each partially-encompassed coverage area, alert gateway 34 may begin by defining the overlapping area between the initial target area and the partially-encompassed coverage area. As with the initial target area, the overlapping area for each partially-encompassed coverage area may have a more complex geometric shape, such as a polygon having relatively complex boundaries that are defined using a large number of geographic coordinates.

The act of defining the overlapping area between the initial target area and a partially-encompassed coverage area may take various forms. As one example, alert gateway 34 may compute a definition of the overlapping area between the initial target area and the partially-encompassed coverage area based on the definitions of the initial target area and the partially-encompassed coverage area. Alert gateway 34 may perform this computation using any technique now know or later developed, including as one example a mathematical algorithm that takes the definitions of the initial target area and the partially-encompassed coverage area as its inputs and generates a definition of their overlapping area as its output.

As another example, alert gateway 34 may obtain a preexisting definition of the overlapping area from a database that contains preexisting definitions of overlapping areas between certain known target areas and their partially-encompassed coverage areas. This database may be stored at alert gateway 34 and/or some other network entity that is accessible by alert gateway 34 (e.g., database 32). Alert gateway 34 may define the overlapping area between the initial target area and a partially-encompassed coverage area in other manners as well.

Figure 4:
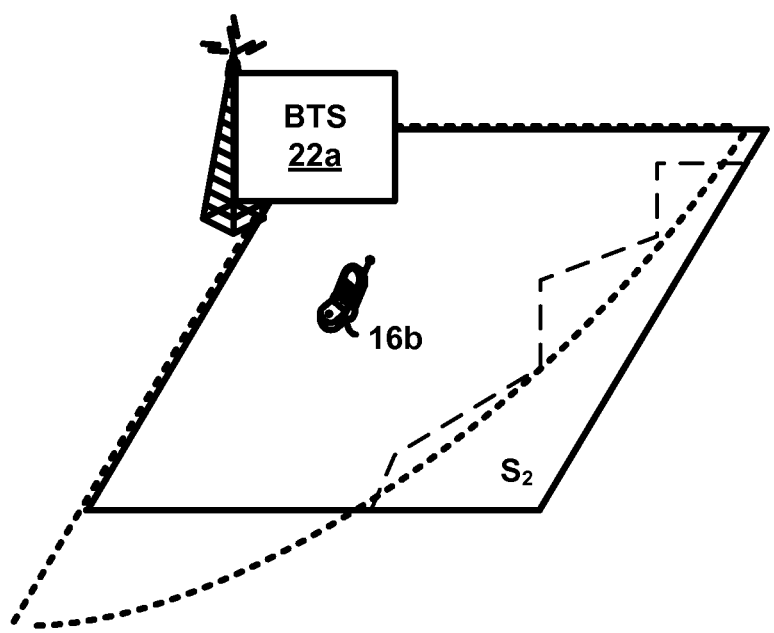
FIG. 4 depicts one possible example of a simplified area that approximates the overlapping area between the initial target area and a given coverage area in the example communication system of FIG. 1.

For each partially-encompassed coverage area, after defining the overlapping area between the initial target area and the partially-encompassed coverage area, alert gateway 34 may then define a simplified area that approximates the overlapping area. This simplified area may take various forms. In a preferred example, the simplified area may be an area having a relatively simple geometric shape, such as a partial or full circle, a triangle, or a rectangle, that approximates the more complex shape of the overlapping area. However, other examples are possible as well. For purposes of illustration, FIG. 4 depicts one possible example of a simplified area $A_2$ that approximates overlapping area for sector $S_2$.

The act of defining the simplified area that approximates the overlapping area between the initial target area and a partially-encompassed coverage area may take various forms. As one example, alert gateway 34 may compute a definition of the simplified area based on the definition of the overlapping area. Alert gateway 34 may perform this computation using any technique now know or later developed for shape approximation, including those that involve line simplification, curve fitting, and/or smoothing. In this respect, the shape approximation technique employed may depend on considerations such as the geometric complexity of the overlapping area, the desired geometric complexity of the simplified area, and/or the desired level of similarity between the overlapping area and the simplified area.

As another example, alert gateway 34 may obtain a preexisting definition of the simplified area from a database that contains preexisting definitions of simplified areas that approximate the overlapping areas between certain known target areas and their partially-encompassed coverage areas. This database may be stored at alert gateway 34 and/or some other network entity that is accessible by alert gateway 34

(e.g., database 32). Alert gateway 34 may define the simplified area in other manners as well.

For each partially-encompassed coverage area, after defining the simplified area, alert gateway 34 may then designate this simplified area as the partially-encompassed coverage area's target area and prepare the definition of the simplified area for broadcast in the partially-encompassed coverage area (e.g., by placing the definition in the appropriate format and storing it in data storage). This definition may take various forms depending on the geometric shape of the simplified area, and may advantageously include less geographic data than the definition of a more geometrically complex target area—which may reduce the network resources required to broadcast the definition in the partially-encompassed coverage areas.

It should be understood that alert gateway 34 may also employ alternate approaches to defining a target area for a partially-encompassed coverage area that is less geometrically complex than the initial target area. For example, instead of defining a partially-encompassed coverage area's target area by simplifying the overlapping area between the initial target area and one partially-encompassed coverage area, alert gateway 34 could simplify the overlapping area between the initial target area and multiple partially-encompassed coverage areas. As another example, instead of defining a partially-encompassed coverage area's target area by first defining the overlapping area between the initial target area and the partially-encompassed coverage area and then simplifying this overlapping area, alert gateway 34 could first simplify the initial target area and then define the overlapping area between this simplified area and the partially-encompassed coverage area. Other approaches for defining a partially-encompassed coverage area's target area are possible as well.

At step 58, after alert gateway 34 defines the respective target area for each partially-encompassed coverage area, wireless carrier network 14 may then (1) broadcast the alert in each fully-encompassed coverage area in a manner that directs a recipient device to output the alert regardless of the device's location and (2) broadcast the alert in each partially-encompassed coverage area in a manner that directs a recipient device to output the alert only if the device's location is encompassed within the respective target area for the partially-encompassed coverage area. These broadcasts may take various forms and may define the directives for outputting the alert in various manners.

In one example implementation, the wireless carrier network's broadcasts may define the different directives for outputting the alert based on whether or not a broadcast includes a definition of a target area for distributing the alert. For instance, according to this implementation, a broadcast that directs a recipient device to output the alert regardless of the device's location will not include a definition of any target area for distributing the alert. And conversely, a broadcast that directs a recipient device to output the alert only if the device's location is within a respective target area for the coverage area in which the broadcast occurs will include the definition the respective target area. In another example implementation, the wireless carrier network's broadcasts may define the directive for outputting the alert based on whether or not a broadcast includes a flag that directs a recipient device to determine whether its location is encompassed within a target area defined by the broadcast. For instance, according to this implementation, a broadcast that directs a recipient device to output the alert regardless of the device's location will not include a flag that directs a recipient device to determine whether its location is encompassed within the defined target area (e.g., the flag will not be set). And conversely, a broadcast that directs a recipient device to output the alert only if the device's location is encompassed within a respective target area for the coverage area in which the broadcast occurs will include a flag that directs a recipient device to determine whether its location is encompassed within the coverage area's respective target area (e.g., the flag will be set). As one possible example, this flag may take the form of a single data bit that can have a value of 0 (e.g., not set) or 1 (e.g., set). The flag may take other forms as well.

It should be understood that the example implementations described above could be also combined. For instance, a broadcast that directs a recipient device to output the alert regardless of the device's location may include neither a definition of a target area nor a flag that directs a recipient device to determine whether its location is encompassed within a target area. And a broadcast that directs a recipient device to output the alert only if the device's location is encompassed within the simplified target area may then include both a definition of the respective target area for the coverage area in which the broadcast occurs and a flag that directs a recipient device to determine whether its location is encompassed within the respective target area. The broadcasts may also define the directives for outputting the alert in other manners.

The entities of wireless carrier network 14 may work together to carry out the broadcasts of the alert in various ways. In one example implementation, alert gateway 34 may be programmed to generate the alert messages for broadcast in the fully-encompassed and partially-encompassed coverage areas. For instance, alert gateway 34 may be programmed to generate, for any fully-encompassed coverage area, an alert message that includes a definition of the alert and excludes a definition of any target area for distributing the alert. And alert gateway 34 may be programmed to generate, for each partially-encompassed coverage area, a respective alert message that includes a definition of the alert, a definition of the partially-encompassed coverage area's respective target area, and perhaps also a flag that directs a recipient device to determine whether its location is encompassed within that target area. Alert gateway 34 may thus be capable of performing various processing tasks that may be involved in generating these alert messages, such as flag generation and message formatting.

After generating the alert messages for broadcast in the fully-encompassed and partially-encompassed coverage areas, alert gateway 34 may then be programmed to transmit the alert messages to the base stations serving fully-encompassed and/or partially-encompassed coverage areas, together with data instructing where each alert message is to be broadcast. For example, with reference to the example depicted in FIGS. 3-4, alert gateway 34 may transmit to base station 22a (1) a first alert message for broadcast in each of sectors $S_1$ and $S_3$ that excludes a target area definition and (2) a second alert message for broadcast in sector $S_2$ that includes a definition of the respective target area for sector $S_2$. And alert gateway 34 may transmit to base station 22b (1) a third alert message for broadcast in sector $S_4$ that includes a definition of the respective target area for sector $S_4$ and (2) a fourth alert message for broadcast in sector $S_6$ that includes a definition of the respective target area for sector $S_6$. The act of transmitting these alert messages to the base stations may take various forms, and may involve communicating with one or more intermediate network entities that may in turn communicate with the base stations.

In turn, base stations 22a-b may each be programmed to receive alert messages from alert gateway 34, evaluate the data instructing where each alert message is to be broadcast, and then broadcast the alert message in accordance with the instruction. For example, with reference to the example depicted in FIGS. 3-4, base station 22a may broadcast the first alert message in each of sectors $S_1$ and $S_3$ and the second alert message in sector $S_2$. And base station 22b may broadcast the third alert message in sector $S_4$ and the fourth alert message in sector $S_6$.

The act of broadcasting these alert messages in the fully-encompassed and partially-encompassed coverage areas may take various forms, which may vary depending on the air-interface protocol employed. In one example implementation, in each fully-encompassed and partially-encompassed coverage area, the serving base station may first transmit an indicator on a control channel regularly monitored by WCDs (e.g., a paging channel) that directs the WCDs located in the coverage area to tune to a channel (or other resource) designated for alert communications. In turn, the serving base station may then broadcast the appropriate alert message one or more times on that channel (or resource). Other implementations for broadcasting the alert messages are possible as well.

It should be understood that the entities of wireless carrier network 14 may also work together in alternate ways to carry out the broadcasts of the alert in the fully-encompassed and partially-encompassed coverage areas. As one example, instead of alert gateway 34 generating the alert messages for broadcast in the fully-encompassed and partially-encompassed coverage areas, base stations 22a-b may each generate the appropriate alert messages for its own fully-encompassed and/or partially-encompassed coverage areas based on information received from alert gateway 34. Other approaches for carrying out the broadcasts in the fully-encompassed and partially-encompassed coverage areas are possible as well.

At step 60, after wireless carrier network 14 broadcasts the alert with the different directives in the sets of fully-encompassed and partially-encompassed coverage areas, WCDs located in such coverage areas may receive the alert broadcasts. For example, with reference to the example depicted in FIGS. 3-4, WCDs located in sectors $S_1$ and $S_3$ (such as WCD 16a) may each receive the alert broadcast with a directive to output the alert regardless of the WCD's location, and WCDs located in sectors $S_2$, $S_4$, and $S_6$ (such as WCDs 16b-c) may each receive the alert broadcast with a directive to output the alert only if the WCD's location is within the respective target area of the serving coverage area.

At step 62, each WCD that receives the alert broadcast may then process it in accordance with the defined directive for outputting the alert. For instance, in accordance with the directive to output the alert regardless of the WCD's location, WCD 16a may respond to receiving the alert broadcast by simply outputting the alert without determining the WCD's location or evaluating whether that location is encompassed within the simplified target area. On the other hand, in accordance with the directive to output the alert only if the WCD's location is encompassed within the respective target area for the serving coverage area, each of WCDs 16b-c may respond to receiving the alert broadcast by determining whether the WCD's location falls within the serving coverage area's respective target area and then only outputting the alert if so. This determination may take various forms.

In one example implementation, each of WCDs 16b-c may first determine its location using any technique now known or later developed. For example, each of WCDs 16b-c may compute its own location using technology such as Global Positioning System (GPS) and/or Assisted GPS (A-GPS). In another example, each of WCDs 16b-c may obtain its location from wireless carrier network 14, which may compute the WCD's using technology such as trilateration and/or time difference of arrival (TDOA). Other examples are possible as well. In some situations, it may also be possible that one or both of WCDs 16b-c will be unable to determine a location that is more granular than the coverage area itself (e.g., due to a lack of GPS signals). If this occurs, WCDs 16b-c will preferably be configured to output the alert.

After determining its location, each of WCDs 16b-c may then evaluate whether the determined location is encompassed within the respective target area defined by the received alert broadcast. WCDs 16b-c may perform this evaluation using any technique now known or later developed. As one example, WCDs 16b-c may perform this evaluation by mapping the respective target area for the serving coverage area and then determining whether the WCD's location falls within this mapped area. As another example, WCDs 16b-c may perform this evaluation by executing an algorithm that includes as inputs the WCD's location and the definition of the respective target area for the serving coverage area. Various other geospatial processing techniques may also be employed. However, regardless of the specific technique employed, the example embodiment may simplify the processing required for WCDs to perform this evaluation because the respective target area is less geometrically complex than the initial target area.

The result of this evaluation then dictates whether each of WCDs 16b-c outputs the alert. For instance, with reference to the example depicted in FIG. 3, WCD 16b may conclude that its determined location is inside the respective target area for sector $S_2$, which may cause WCD 16b to output the alert. Conversely, WCD 16c may conclude that its determined location is outside of the respective target area of sector $S_6$, which may cause WCD 16c to suppress and/or discard the alert.

The act of outputting the alert may also take various forms. As examples, WCDs may output the alert as a textual notification and/or icon that appears in the WCD's display, a flashing light, an audio notification, and/or a vibration. Other examples may be possible as well.

Figure 5:
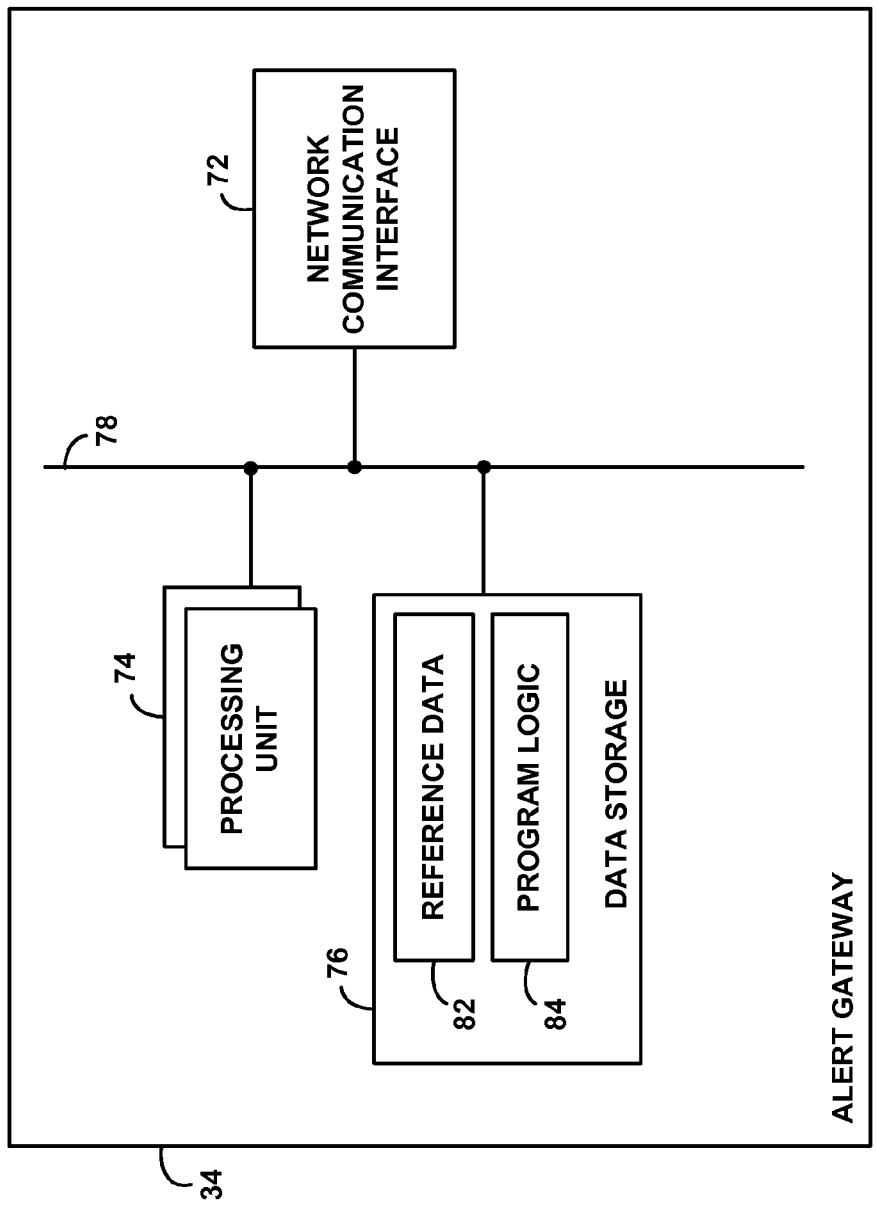
FIG. 5 is a simplified block diagram showing functional components that may be included in example alert gateway to facilitate implementation of the disclosed methods.

FIG. 5 is a simplified block diagram showing functional components that may be included in example alert gateway, such as alert gateway 34, to facilitate implementation of the disclosed methods. As shown, alert gateway 34 may include a network communication interface 72, a processing unit 74, and data storage 76, all linked together via a system bus, network, or other connection mechanism 78. Alert gateway 34 may include other components as well. (As noted above, it should be understood that some or all of these functional components may be distributed across other network entities, such as an MSC, a controller, and/or a base station).

Referring to FIG. 5, network communication interface 72 generally functions to connect alert gateway 34 with core network 14 and enable alert gateway 34 to engage in communication with various other entities, such as alert provider 42 (via transport network 18), database 32, and base stations 22a-b (via one or more other core-network entities and controller 24). Network communication interface 72 may take any suitable form for carrying out these functions, examples of which include an Ethernet interface, a serial bus interface (e.g., Firewire, USB 2.0, etc.), a chipset and antenna adapted to facilitate wireless communication, and/or any other interface that provides for wired and/or wireless communication. Network communication interface 72 may also include multiple interfaces. Other configurations are possible as well.

Processing unit 74 may comprise one or more processor components, such as general-purpose processors (e.g., a microprocessor), special-purpose processors (e.g., an application-specific integrated circuit (ASIC) or digital-signal processor (DSP)), programmable-logic devices (e.g., a field programmable gate array (FPGA)), and/or any other processor components now known or later developed. Processing unit 74 may be integrated in whole or in part with other components of alert gateway 34.

Data storage 76 may then comprise one or more non-transitory computer readable storage mediums, such as volatile data storage mediums (e.g., random access memory (RAM), registers, and/or cache) and/or non-volatile data storage mediums (e.g., read only memory (ROM), a hard-disk drive, a solid-state drive, flash memory, and/or an optical-storage device). Data storage 76 may also be integrated in whole or in part with other components of alert gateway 34.

As shown in Figure, data storage 76 may be arranged to contain reference data 82 and program logic 84. Reference data 82 may comprise various data usable by processing unit 64 to carry out various functions described herein. For example, reference data 82 may include data about the wireless carrier network's coverage areas, such as identification, location, and/or serving-entity data for the coverage areas, which alert gateway 34 may obtain from database 32 and/or in some other manner. As another example, reference data 82 may include alert messages and associated data (e.g., target area definitions). Other examples are possible as well.

Program logic 84 may then comprise machine language instructions or the like that may be executed or interpreted by processing unit 74 to carry out various functions described herein. For example, program logic 84 may be executable by processing unit 74 to (a) receive an alert message that defines that defines an initial target area having a more complex geometric shape, (b) identify a first set of one or more coverage areas that are fully encompassed within the initial target area and a second set of one or more coverage areas that are only partially encompassed within the initial target area, (c) define a respective target area for each partially-encompassed coverage area that is less geometrically complex than the initial target area, (d) cause a broadcast of the alert in the first set of one or more coverage areas in a manner that directs a recipient device to output the alert regardless of the device's location, and (e) cause a broadcast of the alert in the second set of one or more coverage areas in a manner that directs a recipient device to output the alert only if the device's location is encompassed within the respective target area for the serving coverage area. Program logic 84 may be executable by processing unit 74 to carry out various other functions as well.

Figure 6:
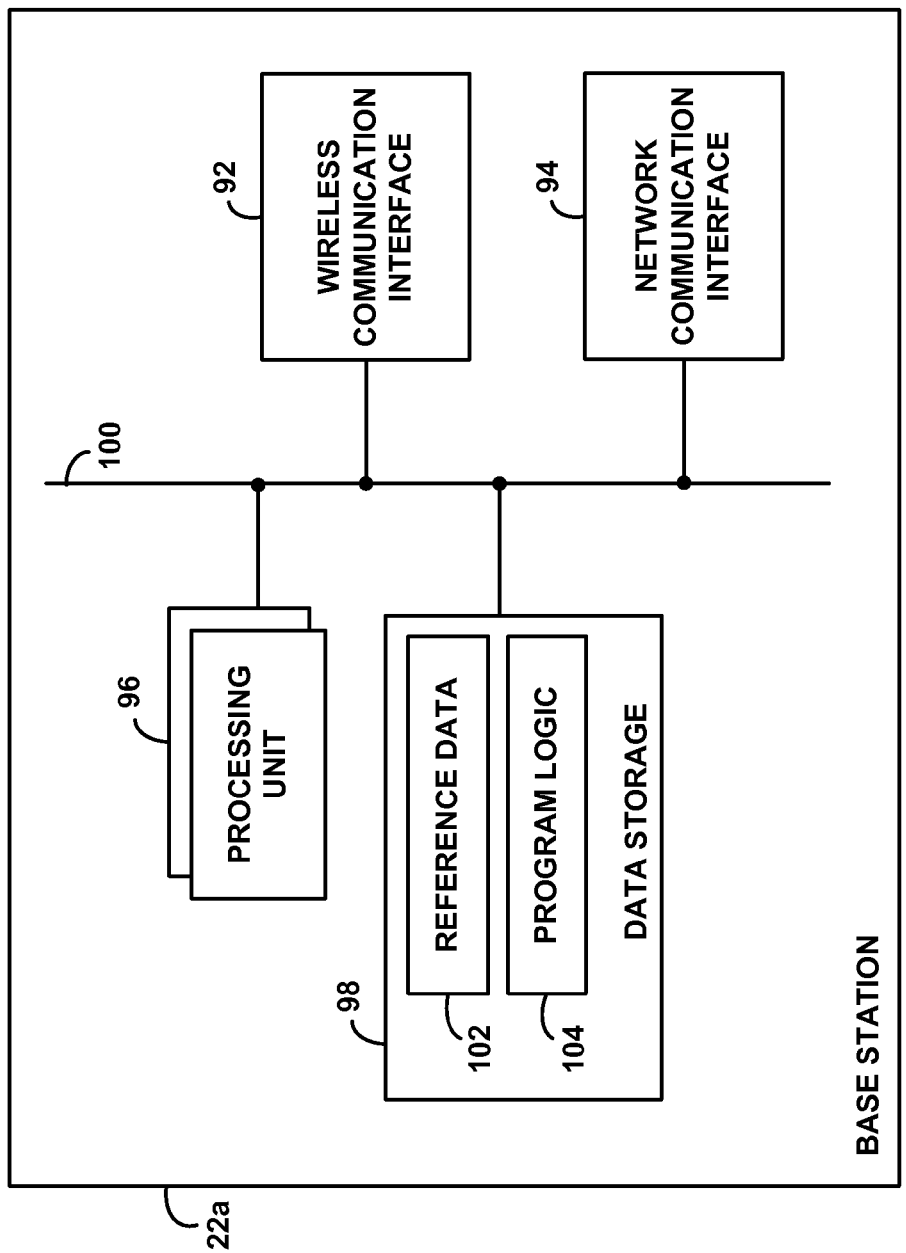
FIG. 6 is a simplified block diagram showing functional components that may be included in example base station to facilitate implementation of the disclosed methods.

FIG. 6 is a simplified block diagram showing functional components that may be included in an example base station, such as base station 22a, to facilitate implementation of the disclosed methods. As shown, base station 22a may include a wireless communication interface 92, a network communication interface 94, a processing unit 96, and data storage 98, all linked together via a system bus, network, or other connection mechanism 100. Base station 22a may include other components as well. (It should be understood that at least some of these functional components might be considered to be part of a controller of base station 22a.)

Referring to FIG. 6, wireless communication interface 92 generally functions to radiate to define one or more coverage areas, such as sectors $S_1$-$S_3$, in which WCDs can operate and engage in wireless communication with base station 22a over an air interface. As such, wireless communication interface 92 may include one or more antenna structures arranged in various ways (e.g., one or more directional or sectored antennas that are potentially tower mounted). Additionally, wireless communication interface 92 may include other associated components, such as a power amplifier and/or a modem for instance. Other configurations are also possible.

Network communication interface 94 generally functions to connect base station 22a to wireless carrier network 14 (e.g., via controller 24 and/or some other entity). Network communication interface 94 may take any suitable form for carrying out this function, examples of which include an Ethernet interface, a serial bus interface (e.g., Firewire, USB 2.0, etc.), a chipset and antenna adapted to facilitate wireless communication, and/or any other interface that provides for wired and/or wireless communication. Network communication interface 94 may also include multiple interfaces. Other configurations are possible as well.

Processing unit 96 may comprise one or more processor components, such as general-purpose processors (e.g., a microprocessor), special-purpose processors (e.g., an ASIC or DSP), programmable-logic devices (e.g., an FPGA), and/or any other processor components now known or later developed. Processing unit 96 may be integrated in whole or in part with other components of base station 22a.

Data storage 98 may then comprise one or more non-transitory computer readable storage mediums, such as volatile data storage mediums (e.g., RAM, registers, and/or cache) and/or non-volatile data storage mediums (e.g., ROM, a hard-disk drive, a solid-state drive, flash memory, and/or an optical-storage device). Data storage 98 may also be integrated in whole or in part with other components of base station 22a.

As shown in FIG. 6, data storage 98 may be arranged to contain reference data 102 and program logic 104. Reference data 102 may comprise various data usable by processing unit 96 to carry out various functions described herein. For example, reference data 102 may include data about the base station's coverage areas, such as identification, location, and/or serving-entity data for the coverage areas. As another example, reference data 102 may include alert messages and associated data. Other examples are possible as well.

Program logic 104 may then comprise machine language instructions or the like that may be executed or interpreted by processing unit 96 to carry out various functions described herein. For example, program logic 104 may be executable by processing unit 96 to receive alert messages and then broadcast them in the base station's coverage areas. Program logic 104 may be executable by processing unit 96 to carry out various other functions as well.

Figure 7:
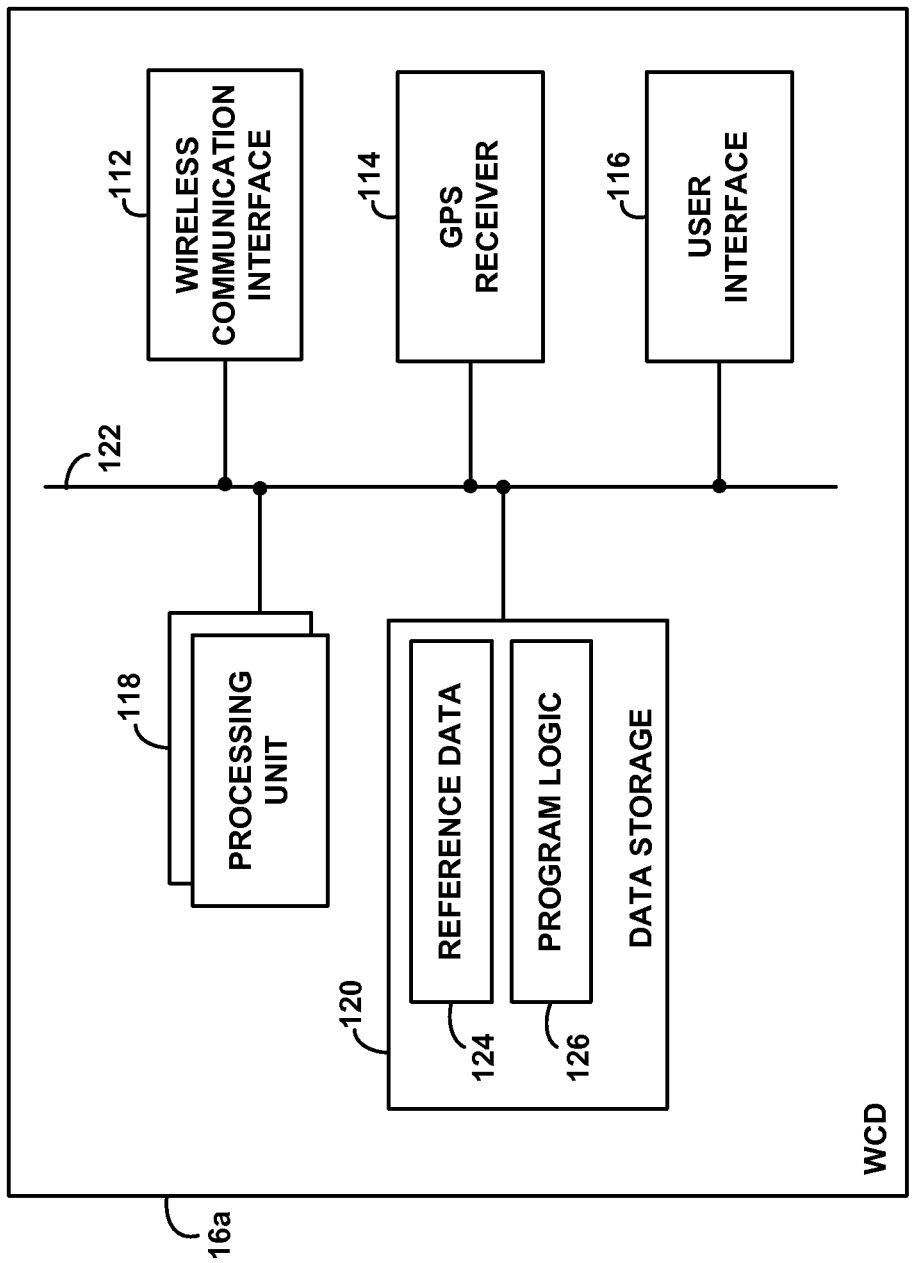
FIG. 7 is a simplified block diagram showing functional components that may be included in example wireless communication device to facilitate implementation of the disclosed methods.

FIG. 7 is a simplified block diagram showing functional components that may be included in an example WCD, such as WCD 16a, to facilitate implementation of the disclosed methods. As shown, example WCD 16a may include a wireless communication interface 112, a GPS receiver 114, a user interface 116, a processing unit 118, and data storage 120, all linked together via a system bus, network, and/or other connection mechanism 122. WCD 16a may include other components as well.

Referring to FIG. 7, wireless communication interface 112 generally functions to facilitate wireless communication with wireless carrier network 14 according to one or more agreed air-interface protocols, such as the example protocols mentioned above. As such, wireless communication interface 112 may include one or more antennas and a chipset that are arranged to communicate according to the one or more protocols. Wireless communication interface 112 take other forms as well.

GPS receiver 114 generally functions to receive and decode satellite-based location data that enables the determination of the WCD's location. GPS receiver 114 may take any suitable form now known or later developed for carrying out this function.

User interface 116 generally functions to facilitate user interaction with WCD 16a, and may thus include or provide connectivity to various components that facilitate such user interaction. For instance, user interface 116 may include or provide connectivity to input components, examples of which include a touch-sensitive screen or pad, a navigation pad, a multi-purpose button, a thumb wheel, a keyboard or keypad, a microphone, etc. Additionally, user interface 116 may include or provide connectivity to output components, examples of which include a display screen, a speaker, a headset jack, etc. Other configurations are possible as well.

Processing unit 118 may comprise one or more processor components, such as general-purpose processors (e.g., a microprocessor), application-specific processors (e.g., an ASIC or DSP), programmable logic devices (e.g., an FPGA), and/or other processor components now known or later developed. Processing unit 118 may be integrated in whole or in part with other components of WCD 16a.

Data storage 120 may then comprise one or more non-transitory computer-readable storage mediums, such as volatile data storage components (e.g., RAM, registers, and/or cache) and/or non-volatile data storage components (e.g., ROM, a hard-disk drive, a solid-state drive, flash memory, an optical storage device, and/or a floppy disk). Data storage 120 may also be integrated in whole or in part with other components of WCD 16a.

As shown in FIG. 7, data storage 120 may be arranged to contain reference data 124 and program logic 126. Reference data 124 may comprise various data usable by processing unit 118 to carry out various functions described herein. For example, reference data 124 may include an identifier of WCD 16a, such as one or more WCD and/or subscriber identifiers (e.g., a directory and/or serial number). As another example, reference data 124 may contain data about the serving coverage area of WCD 16a, such as an identifier of the coverage area itself, identifiers of any shared control channels (or resources) in the coverage area, and identifiers of any assigned channels (or resources) in the coverage area. As yet another example, reference data 124 may include location data for WCD 16a, such as satellite-based location data received from GPS satellites, network-based location data received from wireless carrier network 14, and/or a geographic location of WCD 16a that has been determined based on satellite-based and/or network-based location data. Reference data 124 may include various other data as well.

Program logic 126 may then comprise machine language instructions or the like that may be executed or interpreted by processing unit 118 to carry out various functions described herein. For example, program logic 126 may be executable by processing unit 118 to (a) receive a broadcast of an alert that includes a directive for outputting the alert and (b) process the alert in accordance with this directive. Program logic 126 may be executable by processing unit 118 to carry out various other functions as well.

While example embodiments have been described above, those skilled in the art will understand that changes and modifications may be made to these embodiments without departing from the true scope and spirit of the present invention, which is defined by the claims.

I claim:

1. A method comprising:
receiving a message that defines an initial target area for distribution of an alert;
identifying, from a plurality of wireless coverage areas of a wireless carrier network, a first set of one or more coverage areas that are each only partially encompassed within the initial target area and a second set of one or more coverage areas that are each fully encompassed within the initial target area;
for each coverage area in the first set of one or more coverage areas, defining a respective target area that is less geometrically complex than the initial target area by defining an overlapping area between the initial target area and the coverage area and designating as the respective target area an approximation of the defined overlapping area;
in each coverage area in the first set of one or more coverage areas, broadcasting the alert in a first manner that directs a recipient device to output the alert only if a location of the device is encompassed within the respective target area defined for the coverage area, wherein broadcasting the alert in the first manner comprises broadcasting the alert with a flag that directs a recipient device to determine whether a location of the device is within the respective target area defined for the coverage area; and
in each coverage area in the second set of one or more coverage areas, broadcasting the alert in a second manner that directs a recipient device to output the alert regardless of a location of the device, wherein broadcasting the alert in the second manner comprises broadcasting the alert without the flag.

2. The method of claim 1, wherein the received message comprises a message received from an alert provider.

3. The method of claim 2, wherein identifying the first and second sets of one or more coverage areas comprises:
comparing a definition of the initial target area with definitions of the plurality of coverage areas of the wireless carrier network; and
based on the comparing, identifying as the first set the one or more of coverage areas of the wireless carrier network that are each only partially located within the initial target area and as the second set the one or more coverage areas of the wireless carrier network that are each fully located within the initial target area.

4. The method of claim 1, wherein the simplified approximation of the defined overlapping area comprises one of at least one shape selected from the group consisting of a partial circle, a full circle, a triangle, and a rectangle.

5. The method of claim 1, wherein:
broadcasting the alert in the first manner further comprises broadcasting the alert with a definition of the respective target area defined for the coverage area, and
broadcasting the alert in the second manner further comprises broadcasting the alert without the definition of the respective target area defined for the coverage area.

6. A network entity comprising:
a network communication interface configured to provide connectivity with a wireless carrier network;
a processing unit;
data storage; and
program instructions stored in the data storage and executable by the processing unit to carry out functions comprising:
(a) receiving, via the network communication interface, a message that defines an initial target area for distribution of an alert;
(b) identifying, from a plurality of wireless coverage areas of the wireless carrier network, a first set of one or more coverage areas that are each only partially encompassed within the initial target area and a second set of one or more coverage areas that are each entirely encompassed within the initial target area;

(c) for each coverage area in the first set of one or more coverage areas, defining a respective target area that is less geometrically complex than the initial target area by defining an overlapping area between the initial target area and the coverage area and designating as the respective target area an approximation of the defined overlapping area;

(d) causing the wireless carrier network to broadcast the alert in each coverage area in the first set of one or more coverage areas in a first manner that directs a recipient device to output the alert only if a location of the device is encompassed within the respective target area defined for the coverage area, wherein broadcasting alert in the first manner comprises broadcasting the alert with a flag that directs a recipient device to determine whether a location of the device is within the respective target area defined for the coverage area; and (e) causing the wireless carrier network to broadcast the alert in each coverage area in the second set of one or more coverage areas in a second manner that directs a recipient device to output the alert regardless of a location of the device, wherein broadcasting the alert in the second manner comprises broadcasting the alert without the flag.

7. The network entity of claim 6, wherein identifying the first and second sets of one or more coverage areas comprises:
comparing a definition of the initial target area with definitions of the plurality of coverage areas of the wireless carrier network; and
based on the comparing, identifying as the first set the one or more coverage areas of the wireless carrier network that are each only partially located within the initial target area and as the second set the one or more coverage areas of the wireless carrier network that are each entirely located within the initial target area.

8. The method of claim 6, wherein the simplified approximation of the defined overlapping coverage area comprises one of at least one shape selected from the group consisting of a partial circle, a full circle, a triangle, and a rectangle.

9. The network entity of claim 6, wherein:
broadcasting the alert in the first manner further comprises broadcasting the alert with a definition of the respective target area defined for the coverage area, and
broadcasting the alert in the second manner further comprises broadcasting the alert without the definition of the respective target area defined for the coverage area.

10. The network entity of claim 6, wherein:
causing the wireless carrier network to broadcast the alert in each coverage area in the first set in the first manner comprises sending to each base station of the wireless carrier network that serves at least one coverage area in the first set, via the network communication interface, a communication that causes the base station to broadcast the alert in the at least one coverage area in the first set in the first manner, and
causing the wireless carrier network to broadcast the alert in each coverage area in the second set in the second manner comprises sending to each base station of the wireless carrier network that serves at least one coverage area in the second set, via the network communication interface, a communication that causes the base station to broadcast the alert in the at least one coverage area in the second set in the second manner.

11. The network entity of claim 10, wherein:
the communication that causes the base station to broadcast the alert in the at least one coverage area in the first set in the first manner comprises a first alert message and an instruction to broadcast the first alert message in the at least one coverage area in the first set, and
the communication that causes the base station to broadcast the alert in the at least one coverage area in the second set in the second manner comprises a second alert message and an instruction to broadcast the second alert message in the at least one coverage area in the second set.

12. The network entity of claim 11, wherein:
the first alert message includes a definition of the respective target area, and
the second alert message excludes the definition of the respective target area.

13. The network entity of claim 11, wherein:
the first alert message includes the flag that directs a recipient device to determine whether a location of the device is encompassed within a respective target area, and
the second alert message excludes the flag that directs a recipient device to determine whether a location of the device is encompassed within a respective target area.

14. A non-transitory computer readable medium having stored thereon instructions that are executable by a processing unit to carry out functions comprising:
receiving a message that defines an initial target area for distribution of an alert;
identifying, from a plurality of wireless coverage areas of a wireless carrier network, a first set of one or more coverage areas that are each only partially encompassed within the initial target area and a second set of one or more coverage areas that are each fully encompassed within the initial target area;
for each coverage area in the first set of one or more coverage areas, defining a respective target area that is less geometrically complex than the initial target area by defining an overlapping area between the initial target area and the coverage area and designating as the respective target area an approximation of the defined overlapping area;
in each coverage area in the first set of one or more coverage areas, broadcasting the alert in a manner that directs a recipient device to output the alert only if a location of the device is encompassed within the respective target area defined for the coverage area, wherein broadcasting the alert in the first manner comprises broadcasting the alert with a flag that directs a recipient device to determine whether a location of the device is within the respective target area defined for the coverage area; and
in each coverage area in the second set of one or more coverage areas, broadcasting the alert in a first manner that directs a recipient device to output the alert regardless of a location of the device, wherein broadcasting the alert in the second manner comprises broadcasting the alert without the flag.

15. The non-transitory computer readable medium of claim 14, wherein the simplified approximation of the defined overlapping coverage area comprises one of a partial circle, a full circle, a triangle, and a rectangle.

16. The non-transitory computer readable medium of claim 14, wherein:
broadcasting the alert in the first manner further comprises broadcasting the alert with a definition of the respective target area defined for the coverage area, and broadcasting the alert in the second manner further comprises broadcasting the alert without the definition of the respective target area defined for the coverage area.

\* \* \* \* \*